(12) United States Patent
Wright et al.

(10) Patent No.: US 8,510,419 B2
(45) Date of Patent: Aug. 13, 2013

(54) IDENTIFYING A SUBNET ADDRESS RANGE FROM DNS INFORMATION

(75) Inventors: Lloyd E Wright, Albany, OR (US); Lyn T. Robertson, Albany, OR (US)

(73) Assignee: Hewlett-Packard Development Company, LP, Houston, TX (US)

( * ) Notice: Subject to any disclaimer, the term of this patent is extended or adjusted under 35 U.S.C. 154(b) by 578 days.

(21) Appl. No.: 11/917,722

(22) PCT Filed: Sep. 18, 2007

(86) PCT No.: PCT/US2007/078756
§ 371 (c)(1),
(2), (4) Date: Oct. 14, 2009

(87) PCT Pub. No.: WO2009/038576
PCT Pub. Date: Mar. 26, 2009

(65) Prior Publication Data
US 2010/0064031 A1 Mar. 11, 2010

(51) Int. Cl.
*G06F 15/177* (2006.01)
(52) U.S. Cl.
USPC ........... 709/220; 709/219; 709/221; 709/222; 370/252; 370/338; 370/392

(58) Field of Classification Search
USPC ............ 709/220, 222; 370/352, 401; 726/1, 726/11
See application file for complete search history.

(56) References Cited

U.S. PATENT DOCUMENTS

| | | | |
|---|---|---|---|
| 6,732,165 B1 * | 5/2004 | Jennings, III | 709/220 |
| 6,832,322 B1 * | 12/2004 | Boden et al. | 726/15 |
| 2002/0161879 A1 * | 10/2002 | Richard | 709/223 |
| 2003/0053441 A1 | 3/2003 | Banerjee et al. | |
| 2003/0163583 A1 | 8/2003 | Tarr et al. | |
| 2004/0233916 A1 * | 11/2004 | Takeuchi et al. | 370/395.54 |
| 2005/0286514 A1 | 12/2005 | Cheshire et al. | |
| 2006/0039352 A1 * | 2/2006 | Karstens | 370/352 |
| 2007/0223408 A1 * | 9/2007 | Thielke et al. | 370/310 |
| 2007/0280274 A1 * | 12/2007 | Haraguchi et al. | 370/401 |

FOREIGN PATENT DOCUMENTS

EP   1339190   8/2003

OTHER PUBLICATIONS

"How to calculate Subnets"—Daniel Foss, Apr. 2001 http://www4.northampton.edu/kmanna/Cisco_Student_Web/SG/How-to-Subnert%02010.pdf.*
"How to Subnet a Network"—Brad Reese Jun. 2004 http://www.bradreese.com/how-to-subnet-a-network.pdf.*

* cited by examiner

*Primary Examiner* — Krista Zele
*Assistant Examiner* — Randy Scott

(57) ABSTRACT

Embodiments of identifying a subnet address range from DNS information are disclosed.

7 Claims, 2 Drawing Sheets

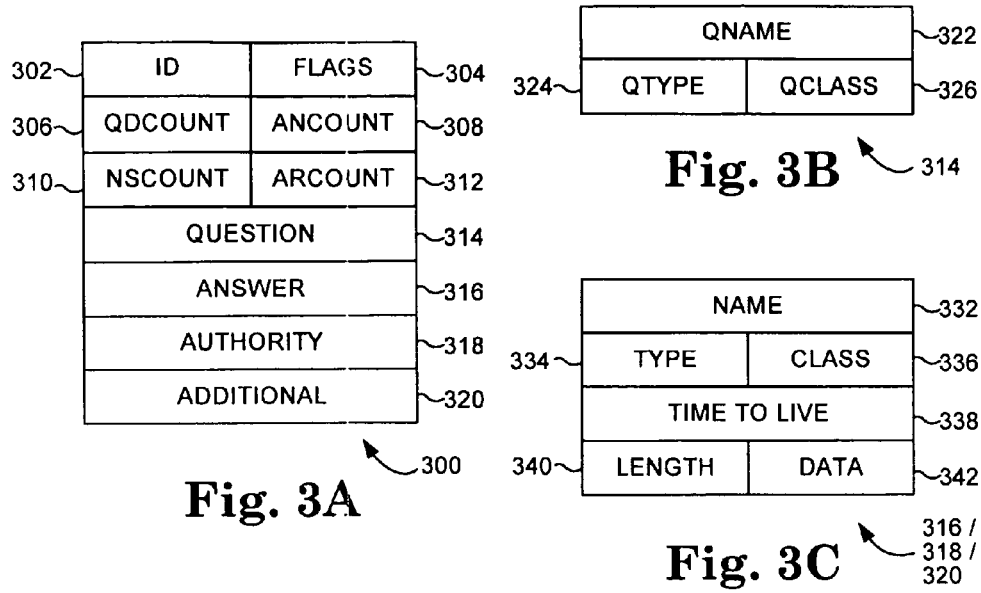
Fig. 3A
Fig. 3B
Fig. 3C
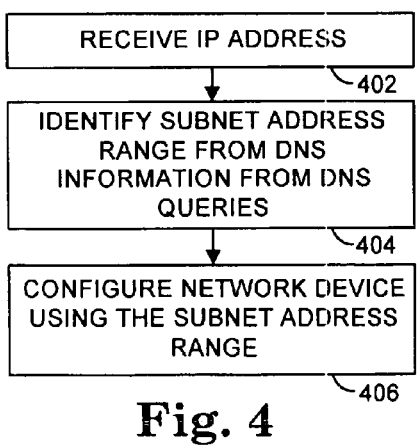
Fig. 4
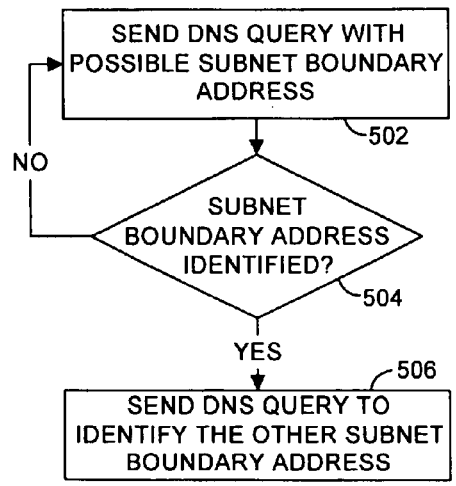
Fig. 5

IDENTIFYING A SUBNET ADDRESS RANGE FROM DNS INFORMATION

BACKGROUND

Network devices are configured to transmit data to and receive data from other network devices. To do so, network devices communicate using one or more protocols such as the Transmission Control Protocol (TCP) and the Internet Protocol (IP) (collectively referred to as TCP/IP). With the Internet Protocol, each network device is assigned an IP address. Each network device in an IP network is typically configured with an IP address and other configuration information manually by a network administrator. By entering this information manually, the network administrator runs the risk of creating configuration errors if any information is not entered correctly.

BRIEF DESCRIPTION OF THE DRAWINGS

FIGS. 3A-3C are block diagrams illustrating embodiments of DNS packet structures.

FIG. 4 is a flow chart illustrating an embodiment of a method for configuring a network device using a subnet address range identified from DNS information.

FIG. 5 is a flow chart illustrating an embodiment of a method for identifying a subnet address range using DNS information.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

According to one embodiment, a configuration unit is configured to identify subnet address range information from Domain Name System (DNS) information is provided. The configuration unit receives the DNS information in response to providing DNS queries to a DNS name server. The configuration unit at least partially configures a network device automatically using the subnet address range.

Figure 1:
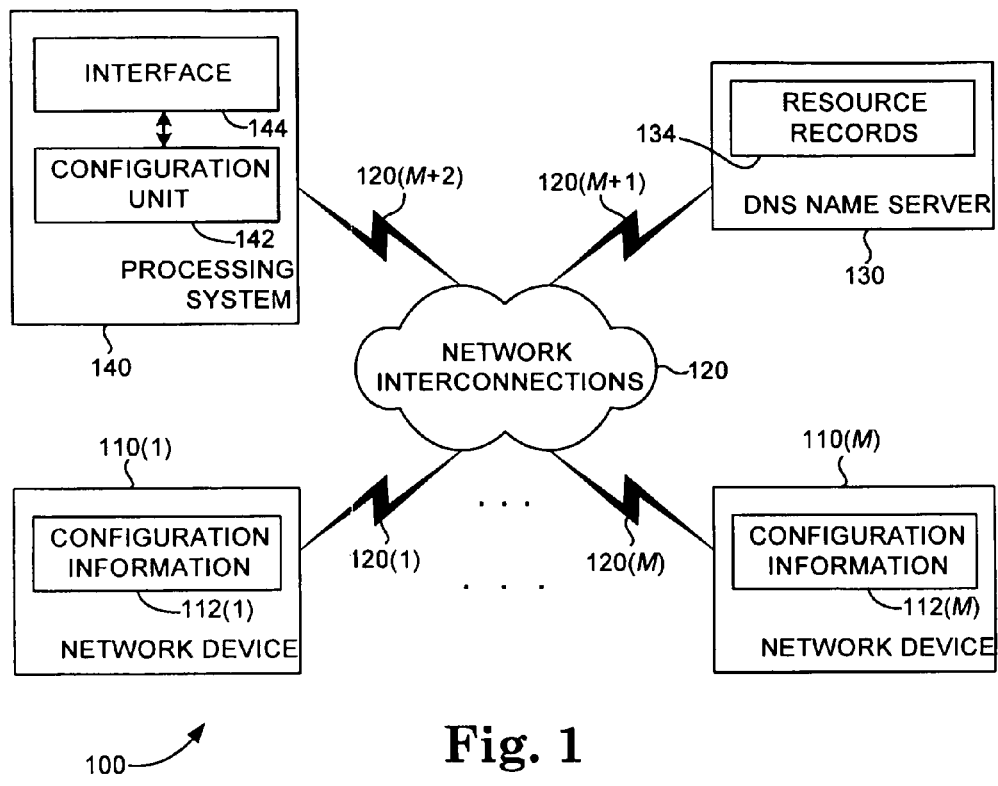
FIG. 1 is a block diagram illustrating an embodiment of network devices connected in a network.

FIG. 1 is a block diagram illustrating an embodiment of network devices 110(1)-110(M) (referred to collectively herein as network devices 110), where M is greater than or equal to two, connected in an Internet Protocol (IP) network 100.

Network 100 operates using a block or range of IP addresses that is assigned by an Internet address authority (e.g., the Internet Assigned Numbers Authority) or a local network administrator. When properly configured, each network device 110 is assigned an IP address in the range of IP addresses by a network administrator. The range of IP addresses may include any combination of IP addresses that are publicly accessible or not publicly accessible (i.e., private) on the Internet. Additional network devices (not shown) connected to one or more of network devices 110 may be assigned additional IP addresses (e.g., local or other private IP addresses) that are outside the range of IP addresses of network 100.

Network devices 110 may be grouped or arranged into any suitable network configuration with any suitable number of sub-networks (i.e., subnets) by a network administrator. The network configuration may include one or more local area networks (LANs) and/or one or more wide area networks (WANs), for example, that may be locally, regionally, or globally distributed. Each subnet includes any suitable combination of one or more LANs and WANs and is assigned a different subnet address range in the range of IP address for network 100.

Each network device 110 in a subnet is assigned an IP address in the subnet address range for that subnet. Each network device 110 may be located in close proximity to one or more other network devices 110 and/or remotely located from one or more other network devices 110.

Network devices 110 are each configured to communicate with other network devices 110 and/or data processing systems (not shown). Each network device 110 receives data from a network device 110 and/or a data processing system and transmits the data to at least one other network device 110 using network interconnections 120. Each network device 110 may be any suitable type of network device configured to communicate with data processing systems or other network devices 110. Examples of a network device include a wired or wireless network component in a data processing system (e.g., a portable or non-portable computer system, a personal digital assistant (PDA), a mobile telephone, an audio/visual (A/V) device, a printer, or a scanner), a router, a switch, a gateway, a firewall, and a bridge.

Network devices 110 may implement any suitable routing protocol to route data through network 100. In one embodiment, network devices 110 implement the Open Shortest Path First (OSPF) protocol. In other embodiments, network devices 110 implement other routing protocols.

In one embodiment, the data that is transmitted and received by network devices 110 may be latency sensitive, constant bandwidth data streams that include audio and/or video (A/V) media exchanged between two or more video conference sites (not shown) connected to network 100. In other embodiments, the data may be any other suitable type of data.

Network devices 110(1)-110(M) each connect to one or more other network devices 110 using respective network connections 120(1)-120(M). Each connection 120(1)-120(M) includes any suitable type and number of wired or wireless communication links that allow a respective network device 110(1)-110(M) to communicate with one or more other network devices 110. Each communication link may be formed from any suitable transmission medium (e.g., optical fiber, copper, and free space) and may transmit data using any suitable transmission protocol in addition to the Internet Protocol.

Network 100 also includes or connects to a DNS name server 130 with a network connection 120(M+1) and a data processing system 140 with a network connection 120(M+2). Each connection 120(M+1) and 120(M+2) includes any suitable type and number of wired or wireless communication links that allow server 130 and system 140, respectively, to communicate with network device 110(1)-110(M) and with one another. Each communication link may be formed from any suitable transmission medium (e.g., optical fiber, copper, and free space) and may transmit data using any suitable transmission protocol in addition to the Internet Protocol.

DNS name server 130 operates according to the DNS protocol and stores DNS resource records (RRs) 134. DNS name server 130 includes RRs 134 that correspond to at least some IP addresses in the range of IP addresses of network 100. In one embodiment, DNS name server 130 operates as a public DNS name server on the Internet or other publicly available network where RRs 134 may be publicly accessed by network devices 110 and network devices that are not in network 100. In another embodiment, DNS name server 130 operates as a local or private DNS name server that is accessible only to network devices 110 and is not accessible to network devices outside that are not in network 100. In other embodiments, one or more additional DNS name servers (not shown) may be included with additional RRs that correspond to at least some IP addresses in the range of IP addresses of network 100. In these embodiments, DNS name server 134 and the additional DNS name server(s) may be configured to operate as any suitable combination of public and local/private DNS name servers.

Figure 2:
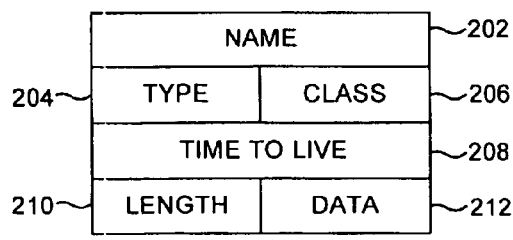
FIG. 2 is a block diagram illustrating an embodiment of a Domain Name System (DNS) resource record.

FIG. 2 is a block diagram illustrating an embodiment of a DNS resource record (RR) 134. Each resource record 134 includes a name field 202, a type field 204, a class field 206, a time to live (TTL) field 208, a data length field 210, and a variable-length data field 212. Name field 202 specifies a name for RR 134 according to a type of RR 134 (e.g., a domain name for an A resource record and an IP address for a PTR resource record). Type field 204 and class field 206 identify a type (e.g., A resource record or PTR resource record) and a class of RR 134, respectively. TTL field 208 designates an amount of time that RR 134 can be cached by a network node. Data length field 210 indicates an amount of data in data field 212, and data field 212 includes data suitable for the type of RR 134 (e.g., an IP address for an A resource record and a domain name for a PTR resource record).

Data processing system 140 includes a configuration unit 142 and an interface 144 and configures network devices 110 by determining and storing configuration information 116 in network devices 110. A portion of configuration information 116 (e.g., an IP address) is received across interface 144 and another portion of configuration information 116 is determined from DNS information in RRs 134 in one embodiment. Configuration unit 142 provides DNS queries to DNS name server 130 using the DNS packet structures shown in FIGS. 3A-3C to access DNS information in RRs 134. In response to DNS queries, DNS name server 130 provides DNS responses with DNS information to configuration unit 142 using the DNS packet structures shown in FIGS. 3A-3C.

FIG. 3A is a block diagram illustrating an embodiment of a DNS packet 300. DNS packet 300 includes an identification (ID) field 302, a flags field 304, a QDCOUNT field 306, an ANCOUNT field 308, an NSCOUNT field 310, an ARCOUNT field 312, a variable-length question field 314, a variable-length answer field 316, a variable-length authority field 318, and a variable-length additional field 320.

ID field 302, flags field 304, QDCOUNT field 306, ANCOUNT field 308, NSCOUNT field 310, and ARCOUNT field 312 form a header portion of DNS packet 300. ID field 302 includes an identifier that allows configuration unit 142 to match a DNS query with a corresponding DNS response from name server 130. Flags field 304 includes information that identifies DNS packet 300 as a query or a response along with other information. QDCOUNT field 306, ANCOUNT field 308, NSCOUNT field 310, and ARCOUNT field 312 specify a number of entries in the variable-length fields 314, 316, 318, and 320, respectively.

As shown in FIG. 3B, each entry of question field 314 includes QNAME field 322 that specifies a query name (e.g., a domain name or an IP address), a QTYPE field 322 that specifies a query type (e.g., an A resource record or a PTR resource record), and a QCLASS field 326 that specifies a query class (e.g., Internet (IN)).

As shown in FIG. 3C, each entry of answer field 316, authority field 318, and additional field 320 includes a name field 332, a type field 334, a class field 336, a time to live (TTL) field 338, a data length field 340, and a variable-length data field 342. In each entry, fields 332-342 include information from fields 202-212, respectively, of a RR 134.

In one embodiment, configuration unit 142 forms DNS queries using the DNS packet structure shown in FIG. 3. In other embodiments, configuration unit 142 may form DNS queries using variations or modifications of the DNS packet structure shown in FIG. 3 as defined by future changes to or adaptations of DNS.

In response to receiving a DNS query from a configuration unit 142, name server 130 provides RRs 134 with name fields 202 that match QNAME field 322 to configuration unit 142. RRs 134 include information that allows various functions to be performed by network devices 110 such as domain name to IP address resolution and IP address to domain name resolution.

In the embodiments described herein, RRs 134 also include information that allows configuration unit 142 to at least partially configure network devices 110 automatically. In particular, RRs 134 include information that identifies subnet address ranges of the IP address range of network 100.

In previous DNS configurations, the base or bottom address and the subnet broadcast or top address of a subnet are generally not used. As a result, DNS resource records for these addresses were not created in these configurations.

In the embodiment of FIG. 1, name server 130 includes RRs 134 for the base address and the subnet broadcast address of each subnet (i.e., the boundary IP addresses of each subnet address range). These RRs 134 include information that allows the subnet address range to be derived by configuration unit 142.

In one embodiment, RRs 134 include at least a PTR resource record for each base address and an A resource record for each subnet broadcast address of each subnet. Referring back to FIG. 2, the PTR resource record for each base address includes the base address in name field 202 and a name in data field 212 that serves as a base address delimiter to indicate that the address in field 202 is a base address of a subnet. The A resource record for each subnet broadcast address includes a name in name field 202 and the subnet broadcast address in data field 212 where the name serves as a subnet broadcast address delimiter to indicate that the address in field 212 is a subnet broadcast address of a subnet. In some embodiments, RRs 134 may also include A resource records for each base address that include the base address and the name from the corresponding PTR resource records and PTR resource records for each subnet broadcast address that include the subnet broadcast address and the name from the corresponding A resource records.

The base address and subnet broadcast address delimiters may include any suitable information that allows configuration unit 142 to derive a subnet address range. In one embodiment, each base address delimiter has a prefix of "bdcst-0s-" and a suffix that includes the IP address of the base address with the periods replaced with dashes. For example, a base address delimiter may be "bdcst-0s-10-1-40-128". Similarly, each subnet broadcast address delimiter has a prefix of "bdcst-1s-" and a suffix that includes the IP address of the subnet broadcast address with the periods replaced with dashes. For example, a subnet broadcast address delimiter may be "bdcst-1s-10-1-40-128". In other embodiments, the base address and subnet broadcast address delimiters include other types and arrangements of information.

Configuration unit 142 uses the subnet address ranges derived from RRs 134 to automatically configure the subnet information and the default gateway IP address of each network device 110. As shown in FIG. 1, network devices 110 each include configuration information 112 which is accessible to and usable by network device 110 during normal operation. Additional details of methods performed by configuration unit 142 according to one embodiment will now be described with reference to the methods of FIGS. 4 and 5.

FIG. 4 is a flow chart illustrating an embodiment of a method for configuring a network device 110 using a subnet address range identified from DNS information. The method of FIG. 4 will be described as being performed by configuration unit 142 on network device 110(1) in one embodiment. Configuration unit 142 also performs the method of FIG. 4 on the remaining network devices 110 independently in one embodiment.

Configuration unit 142 receives an IP address assigned to network device 110(1) as indicated in a block 402. A network administrator accesses interface 144 and enters an IP address for network device 110(1). Interface 144 receives the IP address and provides the IP address to configuration unit 142. Configuration unit 142 stores the IP address as part of configuration information 112(1). As an example, the IP address assigned to network device 110(1) may be 10.1.40.178.

Configuration unit 142 identifies a subnet address range from DNS information received in response to DNS queries as indicated in a block 404. Configuration unit 142 causes DNS information to be received from name server 130 that identifies a subnet address range that includes the IP address of network device 110(1). Configuration unit 142 causes the DNS information to be received by providing DNS queries based on the IP address assigned to network device 110(1) to name server 130. Name server 130 provides DNS responses for the DNS queries where one or more of the DNS responses include DNS information that identifies the subnet address range of a subnet that includes network device 110(1).

FIG. 5 is a flow chart illustrating an embodiment of a method for identifying a subnet address range using DNS information. In the embodiment of FIG. 5, configuration unit 142 sends a DNS query with a possible subnet boundary address as indicated in a block 502. Configuration unit 142 derives possible subnet boundary addresses from the IP address assigned to network device 110(1). Subnet address ranges typically range from a base address that is divisible by a power of two to a subnet broadcast address that is one address below an address that is greater than the base address and is divisible by a power of two. Accordingly, configuration unit 142 may select a possible subnet boundary address that is less than the IP address assigned to network device 110(1) and divisible by a power of two in one embodiment. For example, where the IP address assigned to network device 110(1) is 10.1.40.178, configuration unit 142 may select a possible subnet boundary address of 10.1.40.176. In other embodiments, configuration unit 142 derives a possible subnet boundary address in other suitable ways. Configuration unit 142 sends a DNS query with this possible subnet boundary address to name server 130 to request PTR RRs 134 corresponding to address 10.1.40.176.

A determination is made by configuration unit 142 as to whether the subnet boundary address has been identified using the DNS information received in response to the DNS query as indicated in a block 504. Configuration unit 142 analyzes the received DNS information to determine whether it includes a boundary address delimiter. In the example where 10.1.40.176 was used as the possible subnet boundary address, configuration unit 142 examines the received RRs 134 that correspond to address 10.1.40.176. If the RRs 134 that correspond to address 10.1.40.176 do not include a boundary address delimiter, then configuration unit 142 determines that a subnet boundary address has not been identified.

If the subnet boundary address has not been identified, then configuration unit 142 repeats the function of block 502 with another possible subnet boundary address. The functions of blocks 502 and 504 continue to repeat to provide a series of DNS queries with different possible boundary addresses to name server 130 until DNS information corresponding to at least one of the series of DNS queries identifies a boundary address of the subnet address range.

For example, configuration unit 142 may select a possible subnet boundary address of 10.1.40.128 and perform the function of block 502 with this possible boundary address. In examining the received RRs 134 that correspond to address 10.1.40.128, configuration unit 142 may locate the delimiter "bdcst-0s-10-1-40-128" which indicates that address 10.1.40.128 is the base address of the subnet that includes network device 110(1). Accordingly, configuration unit 142 determines that a subnet boundary address has been identified as 10.1.40.128 in this example.

If the subnet boundary address has been identified, then configuration unit 142 sends a DNS query to identify the other subnet boundary address as indicated in a block 506. Configuration unit 142 may use DNS information from the DNS query that identified the subnet base address in this subsequent DNS query. In one embodiment, configuration unit 142 includes a name of with a prefix of "bdcst-1s-" and a suffix that includes the IP address of the base address of the subnet with the periods replaced with dashes to request A RRs 134. Using the above example, configuration unit 142 provides an A resource record DNS query with a name "bdcst-1s-10-1-40-128". In response to this DNS query, configuration unit 142 receives DNS information from corresponding to the name "bdcst-1s-10-1-40-128" A RRs 134. This DNS information may indicate that the subnet broadcast address is 10.1.40.191, for example. In one embodiment, configuration unit 142 includes other suitable names in the DNS query to cause the subnet broadcast address to be identified.

Referring back to FIG. 4, configuration unit 142 configures network device 110(1) using the subnet address range as indicated in a block 406. By determining the base address and the subnet broadcast address of the subnet of network device 110(1), configuration unit 142 knows the size of the subnet and the address bounds of the subnet. Configuration unit 142 stores this subnet address range information as configuration information 112(1) such that the subnet address range information is useable by network device 110(1) in normal operation. In addition, configuration unit 142 may also derive a default gateway IP address for network device 110(1) from the subnet address range. For example, configuration unit 142 may set a default gateway IP address to be the address that is offset by one from the base address (e.g., 10.1.40.129). In other embodiments, configuration unit 142 may set a default gateway IP address to be at other offsets from the base address or the subnet broadcast address. Configuration unit 142 stores the default gateway IP address in configuration information 112(1) such that the default gateway IP address is useable by network device 110(1) in normal operation.

Configuration unit 142 may be implemented using any suitable combination of hardware and software components. In one embodiment, configuration unit 142 includes a program that is stored in any suitable portable or non-portable storage medium (not shown) within or accessible to data processing system 140. The program is accessible to and executable by a processor (not shown) in system 140 to perform the functions of configuration unit 142 described above.

The use of the above embodiments may allow for a reduction in data entry errors in configuring network devices. The above embodiments also conveniently store information for configuring network devices in central location that can be made readily accessible to network devices on a public or private network.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A system comprising:
a network device; and
a configuration unit configured to cause Domain Name System (DNS) information to be received from a DNS name server that identifies a subnet address range that includes a first IP address and configured to configure the network device using the subnet address range,
wherein the configuration unit is configured to provide a first DNS query to the DNS name server to cause at least a first part of the DNS information to be received from the DNS name server,
wherein the first DNS query includes a second IP address that is derived from the first IP address, and wherein the first part of the DNS information identifies a first boundary address of the subnet address range, and
wherein the configuration unit is configured to provide a second DNS query to the DNS name server to cause at least a second part of the DNS information to be received from the DNS name server, wherein the second DNS query includes a name derived from the first part of the DNS information, and wherein the second part of the DNS information identifies a second boundary address of the subnet address range.

2. The system of claim 1 wherein the configuration unit is configured to derive a default gateway IP address for the network device from the DNS information and store the default gateway IP address for use by the network device.

3. The system of claim 2 wherein the configuration unit is configured to derive the default gateway IP address by adding an offset to a boundary address of the subnet address range.

4. A system comprising:
a network device; and
a configuration unit configured to cause Domain Name System (DNS) information to be received from a DNS name server that identifies a subnet address range that includes a first IP address and configured to configure the network device using the subnet address range,
wherein the configuration unit is configured to provide a series of DNS queries, each DNS query including a different possible boundary address of the subnet address range, to the DNS name server until the DNS information corresponding to at least one of the series of DNS queries identifies a first boundary address of the subnet address range, and
wherein the configuration unit is configured to provide an additional DNS query to the DNS name server to identify a second IP address of the subnet address range.

5. A method comprising:
providing, from a configuration unit, a plurality of DNS queries to a DNS name server;
configuring, via the configuration unit, a network device with a subnet address range identified from DNS information received in response to the plurality of DNS queries;
deriving a default gateway IP address from the subnet address range; and
configuring the network device with the default gateway IP address,
wherein a first one of the plurality of DNS queries requests a PTR resource record corresponding to a first IP address that is derived from a second IP address that is assigned to the network device,
wherein the DNS information received in response to the first one of the plurality of DNS queries includes a first name that identifies a first boundary address of the subnet address range,
wherein a second one of the plurality of DNS queries requests an A resource record corresponding to a second name that is derived from the first name, and
wherein the DNS information received in response to the second one of the plurality of DNS queries includes a second boundary address of the subnet address range.

6. A system comprising:
A processor; and
A non-transitory storage medium storing a program executable by the processor to:
identify a subnet address range of a network device from DNS information received in response to a plurality of DNS queries;
configure the network device with the subnet address range;
derive a default gateway IP address from the subnet address range; and
configure the network device with the default gateway IP address,
wherein at least a first one of the plurality of DNS queries includes a first IP address that is derived from a second IP address assigned to the network device; and
wherein at least a second one of the plurality of DNS queries includes a first name that is derived from a first part of the DNS information corresponding to the first one of the plurality of DNS queries.

7. A system comprising:
A processor; and
a non-transitory storage medium storing a program executable by the processor to:
identify a subnet address range of a network device from DNS information received in response to a plurality of DNS queries; and
configure the network device with the subnet address range;
wherein at least a first one of the plurality of DNS queries includes a first IP address that is derived from a second IP address assigned to the network device: and
wherein a first boundary of the subnet address range is determined from the first part of the DNS information corresponding to the first one of the plurality of DNS queries, and wherein a second boundary of the subnet address range is determined from a second part of the DNS information corresponding to the second one of the plurality of DNS queries.

\* \* \* \* \*

UNITED STATES PATENT AND TRADEMARK OFFICE
CERTIFICATE OF CORRECTION

| | | |
|---|---|---|
| PATENT NO. | : 8,510,419 B2 | Page 1 of 1 |
| APPLICATION NO. | : 11/917722 | |
| DATED | : August 13, 2013 | |
| INVENTOR(S) | : Lloyd E Wright et al. | |

It is certified that error appears in the above-identified patent and that said Letters Patent is hereby corrected as shown below:

In the Claims

In column 8, line 33, in Claim 6, delete "A" and insert -- a --, therefor.

In column 8, line 34, in Claim 6, delete "A" and insert -- a --, therefor.

In column 8, line 53, in Claim 7, delete "A" and insert -- a --, therefor.

In column 8, line 63, in Claim 7, delete "device:" and insert -- device; --, therefor.

Signed and Sealed this
Nineteenth Day of November, 2013

Teresa Stanek Rea
*Deputy Director of the United States Patent and Trademark Office*